US012387637B2

(12) United States Patent
Kuo et al.

(10) Patent No.: US 12,387,637 B2
(45) Date of Patent: Aug. 12, 2025

(54) PROJECTION DEVICE AND DRIVING METHOD OF PROJECTION DEVICE

(71) Applicant: Coretronic Corporation, Hsin-Chu (TW)

(72) Inventors: You-Xuan Kuo, Hsin-Chu (TW); Chen-Cheng Chou, Hsin-Chu (TW); Jeng-An Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/732,523

(22) Filed: Jun. 3, 2024

(65) Prior Publication Data

US 2024/0412670 A1 Dec. 12, 2024

(30) Foreign Application Priority Data

Jun. 8, 2023 (CN) ......................... 202310674617.0

(51) Int. Cl.
*G09G 3/00* (2006.01)

(52) U.S. Cl.
CPC .................................... *G09G 3/001* (2013.01)

(58) Field of Classification Search
CPC ...................................................... G09G 3/001
USPC ......................................................... 345/214
See application file for complete search history.

(56) References Cited

U.S. PATENT DOCUMENTS 11,323,668 B2 5/2022 Chang et al.
2015/0061527 A1* 3/2015 Hamanaka ............ H02M 3/158
315/209 R
2021/0092332 A1* 3/2021 Chang .................. H04N 9/3197

FOREIGN PATENT DOCUMENTS

CN 114900674 B * 4/2024 ........... H04N 9/3144
TW I505748 10/2015

* cited by examiner

*Primary Examiner* — Mark Edwards
(74) *Attorney, Agent, or Firm* — JCIPRNET

(57) ABSTRACT

A projection device and a driving method of the projection device are provided. The projection device includes a signal processing circuit, a driving circuit, a light-emitting module, and a discharge circuit. The signal processing circuit is configured to provide a modulation signal and a first signal. The driving circuit is coupled to the signal processing circuit and a driving node. The driving circuit is configured to generate a driving signal to the driving node according to the modulation signal. The light-emitting module is coupled to the driving circuit through the driving node. The light-emitting module is configured to receive the driving signal from the driving node to accordingly emit a laser beam. The discharge circuit is coupled to the signal processing circuit and the driving node. The discharge circuit is configured to provide a reference voltage to the driving node according to the first signal.

14 Claims, 10 Drawing Sheets

PROJECTION DEVICE AND DRIVING METHOD OF PROJECTION DEVICE

CROSS-REFERENCE TO RELATED APPLICATION

This application claims the priority benefit of China application serial no. 202310674617.0, filed on Jun. 8, 2023. The entirety of the above-mentioned patent application is hereby incorporated by reference herein and made a part of this specification.

BACKGROUND

Technical Field

The disclosure relates to a projection device and a method, and in particular, relates to a projection device and a driving method of the projection device.

Description of Related Art

For a laser projector, a plurality of micro-reflectors on a digital micro-mirror device (DMD) are used most of the time to project a laser beam onto a target area. In order to average the damage of use of each of the micro-reflectors, the micro-reflectors are periodically flipped. Therefore, how to appropriately control the operation of a laser projector to prevent light leakage from generating when the micro-reflectors are flipped become one of the important issues to be considered when designing the laser projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection device and a driving method of the projection device capable of preventing light leakage from generating effectively.

Other objects and advantages of the invention may be further illustrated by the technical features broadly embodied and described as follows.

In order to achieve the above one, part of, or all of the objects or other objects, the disclosure provides a projection device including a signal processing circuit, a driving circuit, a light-emitting module, and a discharge circuit. The signal processing circuit is configured to provide a modulation signal and a first signal. The driving circuit is coupled to the signal processing circuit and a driving node. The driving circuit is configured to generate a driving signal to the driving node according to the modulation signal. The light-emitting module is coupled to the driving circuit through the driving node. The light-emitting module is configured to receive the driving signal from the driving node to accordingly emit a laser beam. The discharge circuit is coupled to the signal processing circuit and the driving node. The discharge circuit is configured to provide a reference voltage to the driving node according to the first signal.

In order to achieve the above one, part of, or all of the objects or other objects, the disclosure further provides a driving method, and the method includes the following steps. A signal processing circuit generates modulation signal and a first signal. A driving circuit generates a driving signal to a driving node according to the modulation signal to control a light-emitting module of a projection device to emit a laser beam according to the driving signal. A discharge circuit coupled to the driving node selectively provides a reference voltage to the driving node according to the first signal.

To sum up, in the projection device and the driving method of the projection device, when the micro-reflector flips, the voltage of the driving signal provided by the driving circuit to the driving node of the light-emitting module is directly pulled down, so that the light-emitting module is immediately turned off, and light leakage is thus prevented from generating.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

The accompanying drawings are included to provide a further understanding of the invention, and are incorporated in and constitute a part of this specification. The drawings illustrate embodiments of the invention and, together with the description, serve to explain the principles of the invention.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
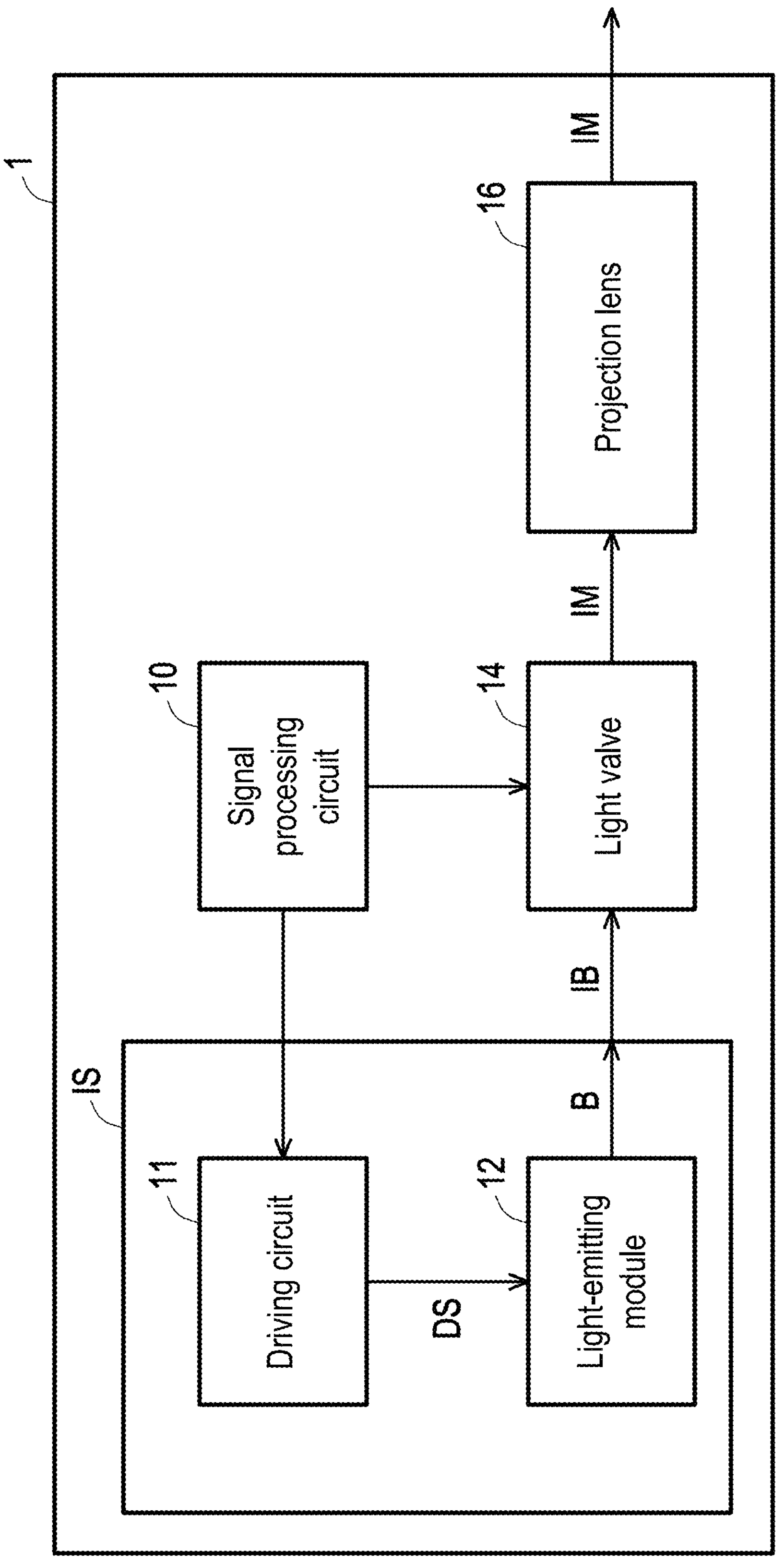
FIG. 1A is a structural diagram of a projection device 1.

FIG. 1A is a structural diagram of a projection device 1. The projection device 1 includes an illumination system IS, a signal processing circuit 10, a driving circuit 11, a light valve 14, and a projection lens 16. Herein, the illumination system IS includes the driving circuit 11, a light-emitting module 12, a phosphor wheel (not shown and non-essential), a filter wheel (not shown and non-essential), a lens element, and other optical elements for providing an illumination beam IB to the light valve 14. The light-emitting module 12 includes, for example, at least one laser diode (LD) and is coupled to the driving circuit 11, and the driving circuit 11 is configured to control the light-emitting module 12 to emit a laser beam B. The signal processing circuit 10 is coupled to the light valve 14 for providing the light valve 14 with an image signal (not labeled) for display. The light valve 14 is disposed on a transmission path of the illumination beam IB and is configured to convert the illumination beam IB into an image beam IM according to the image signal. The projection lens 16 is disposed on a transmission path of the image beam IM from the light valve 14 for projecting the image beam IM out of the projection device 1. In this embodiment, the light valve 14 is, for example, a digital micro-mirror device (DMD), and the DMD is formed by a plurality of micro-reflectors. One micro-reflector is equivalent to a pixel unit, and each micro-reflector may be rotated by a specific angle. The image signal is processed and then provided to the DMD to control the deflection of these micro-reflectors, and the image signal may be reflected into the projection lens 16 or away from the projection lens 16 depending on the different deflection angles of the micro-reflectors. The projection device 1 is, for example, a digital light processing (DLP) projector, which is a technology based on the DMD to display visual digital information. In terms of the overall operation of the projection device 1, the light-emitting module 12 irradiates the laser beam B to the phosphor wheel and then to the filter wheel to form light of different colors. The illumination system IS may output light of different colors at different timings or/and simultaneously output light of a plurality of different colors at the same timing, so as to provide the illumination beam IB to these micro-reflectors (not shown in FIG. 1A) of the light valve 14. The light valve 14 converts the illumination beam IB into the image beam IM, transmits the image beam IM to the projection lens 16 through the reflection of these micro-reflectors, and then projects the image beam IM onto a target area through the projection lens 16. In some embodiments, in order to avoid damage to the same surfaces of the micro-reflectors or the same areas of the reflectors due to long-term irradiation, in each frame time of the projection device 1, a time interval (i.e., disabled interval) for controlling the flipping of the micro-reflectors is arranged. By controlling the micro-reflectors to turn over in the flipping time interval, the service time of each reflecting surface of each of the micro-reflector is averaged. In this way, the failure of the projection device 1 caused by excessive use of the reflective surfaces in specific areas on the micro-reflectors is effectively prevented from generating, and the service life and reliability of the micro-reflectors are thereby improved.

Figure 1B:
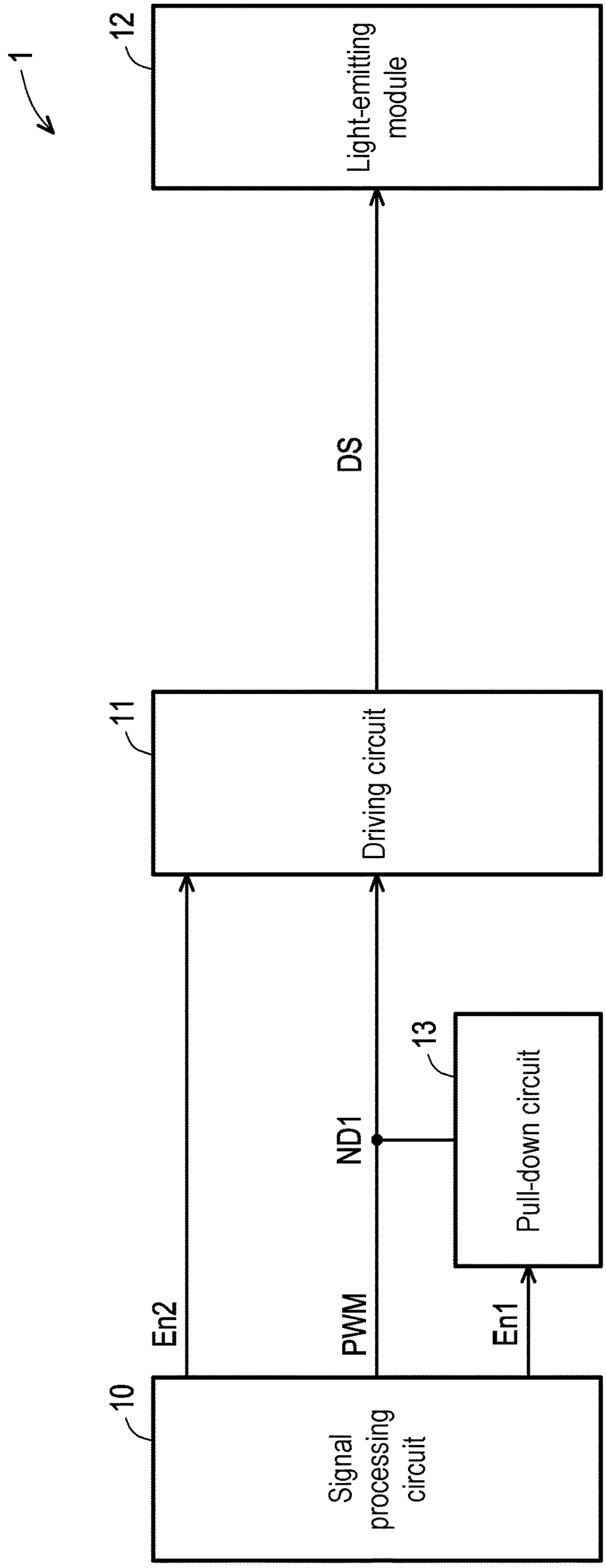
FIG. 1B is a partial circuit block diagram of the projection device 1 in FIG. 1A.

FIG. 1B is a partial circuit block diagram of the projection device 1 in FIG. 1A. Some of the circuits of the projection device 1 includes the signal processing circuit 10, the driving circuit 11, the light-emitting module 12, and a pull-down circuit 13. Simply out, the signal processing circuit 10 is configured to generate a modulation signal PWM, a first signal En1, and a second signal En2. The driving circuit 11 is coupled to the signal processing circuit 10, and the driving circuit 11 can receive the modulation signal PWM and the second signal En2 to generate a driving signal DS. The light-emitting module 12 is coupled to the driving circuit 11, and the light-emitting module 12 is configured to receive the driving signal DS to emit the laser beam B. When it is necessary to avoid damage to the same surfaces of the micro-reflectors or the same area of the reflectors due to long-time irradiation, the signal processing circuit 10 may provide the first signal En1 to the pull-down circuit 13. To be specific, the pull-down circuit 13 is coupled onto a node ND1 between the signal processing circuit 10 and the driving circuit 11, and the node ND1 is also used to transmit the modulation signal PWM from the signal processing circuit 10 to the driving circuit 11. The pull-down circuit 13 may pull down a voltage on the node ND1 to a level of a reference voltage (e.g., ground voltage) according to the control of the first signal En1, so as to accordingly turn off the driving circuit 11 and to control the micro-reflectors to temporarily stop or disable the light-emitting of the light-emitting module 12 at the flipping time interval.

Figure 2A:
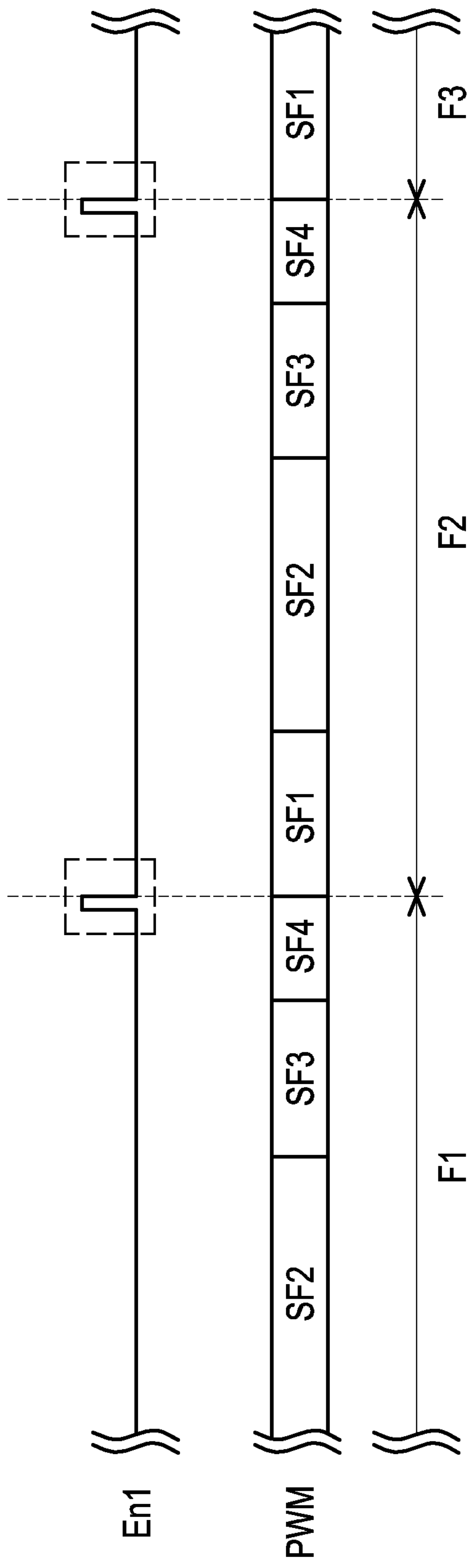
FIG. 2A is a partial signal waveform diagram of the circuit block diagram of FIG. 1B.

FIG. 2A is a partial signal waveform diagram of the circuit block diagram of FIG. 1B. FIG. 2A illustrates a signal waveform diagram of the first signal En1 and the modulation signal PWM. As shown in FIG. 2A, the first signal En1 and the modulation signal PWM are provided in a plurality of frame times F1 to F3. Further, each frame time may be further divided into a plurality of sub-frame times SF1 to SF4 to correspond to the modulation signal PWM of different colors. For instance, the modulation signal PWM may correspond to the magnitude of currents in green, yellow, red, and blue respectively in the sub-frame times SF1, SF2, SF3, and SF4. Besides, the first signal En1 may periodically control the voltage on the node ND1 to be pulled down to the level of the reference voltage (e.g., ground voltage) in each frame time, so as to accordingly turn off the driving circuit 11 and to control the micro-reflectors to temporarily stop or disable the light-emitting of the light-emitting module 12 at the flipping time interval. In some embodiments, a ratio of the flipping time interval of the micro-reflectors to a duration of each picture frame is 1/99. In other words, the projection device 1 may reserve 1/99 of a cycle time in each frame time to flip the micro-reflectors. In some embodiments, the flipping time interval of the micro-reflectors is located in the sub-frame time SF4, for example, it is the time interval for controlling the blue laser beam. Since the blue laser beam has a lower brightness than other colors of laser beams, controlling the sub-frame time of the blue laser beam to flip the micro-reflectors can avoid sacrificing the overall brightness of the light.

Figure 2B:
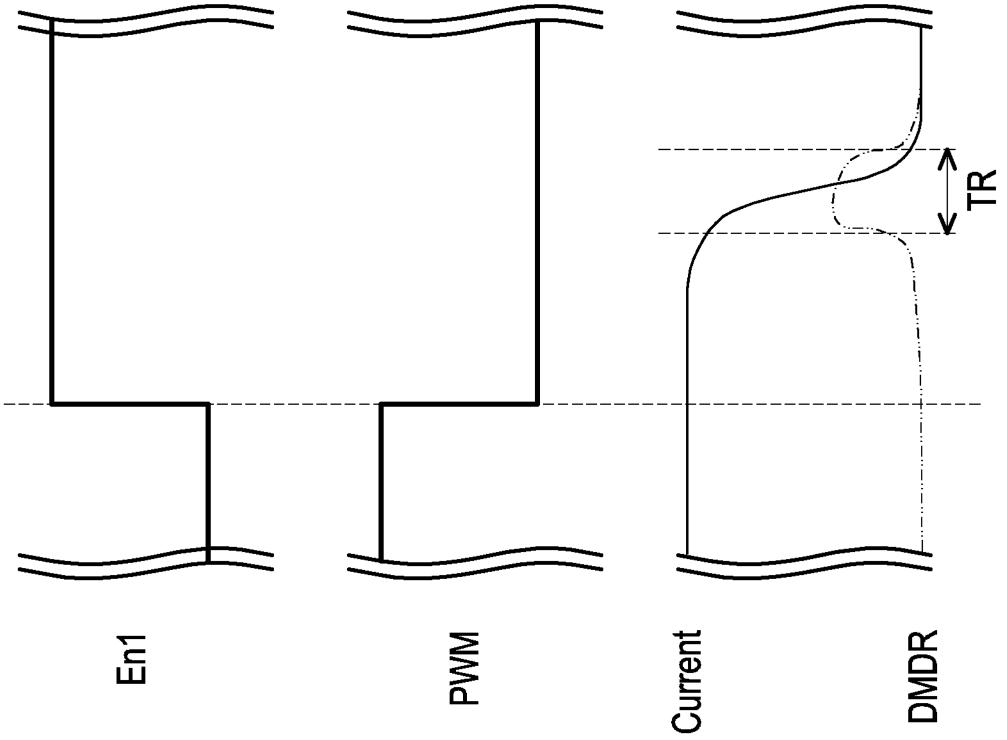
FIG. 2B is a partial signal waveform diagram of the circuit block diagram of FIG. 1B.

FIG. 2B is a partial signal waveform diagram of the circuit block diagram of FIG. 1B. To be specific, FIG. 2B illustrates a signal waveform diagram near a rising edge of the first signal En1. Besides, FIG. 2B also illustrates a flipping signal DMDR (not shown in FIG. 2A) for controlling the flipping of the micro-reflectors, which is used to indicate when the micro-reflectors actually flip. As shown in FIG. 2B, when the first signal En1 rises from the low voltage level to the high voltage level, the modulation signal PWM may be pulled down to the level of the reference voltage (e.g., ground voltage) by the pull-down circuit 13 in real time, so the light-emitting module 12 is accordingly turned off. However, since energy storage elements (capacitor and inductor) inside the driving circuit 11 have remaining energy that has not been fully released (the discharge curve of a current Current of the energy storage elements), the energy storage elements (capacitor and inductor) need to discharge energy for a period of time before the light-emitting module 12 is completely turned off.

On the other hand, the flipping signal DMDR for controlling the flipping of the micro-reflectors controls the flipping of the micro-reflectors in at flipping time interval. In the embodiment shown in FIG. 2B, the flipping signal DMDR may, for example, control the micro-reflectors to flip at a time interval TR. However, if the micro-reflectors start to flip before the energy storage elements (capacitor and inductor) have completely released the energy, the time interval for enabling the flipping signal DMDR overlaps with the time interval when the energy storage elements (capacitor and inductor) have not completely released the energy. This will lead to the problem that the light-emitting module 12 does not temporarily stop the light emission when the micro-reflectors flip, resulting in light leakage.

Figure 3A:
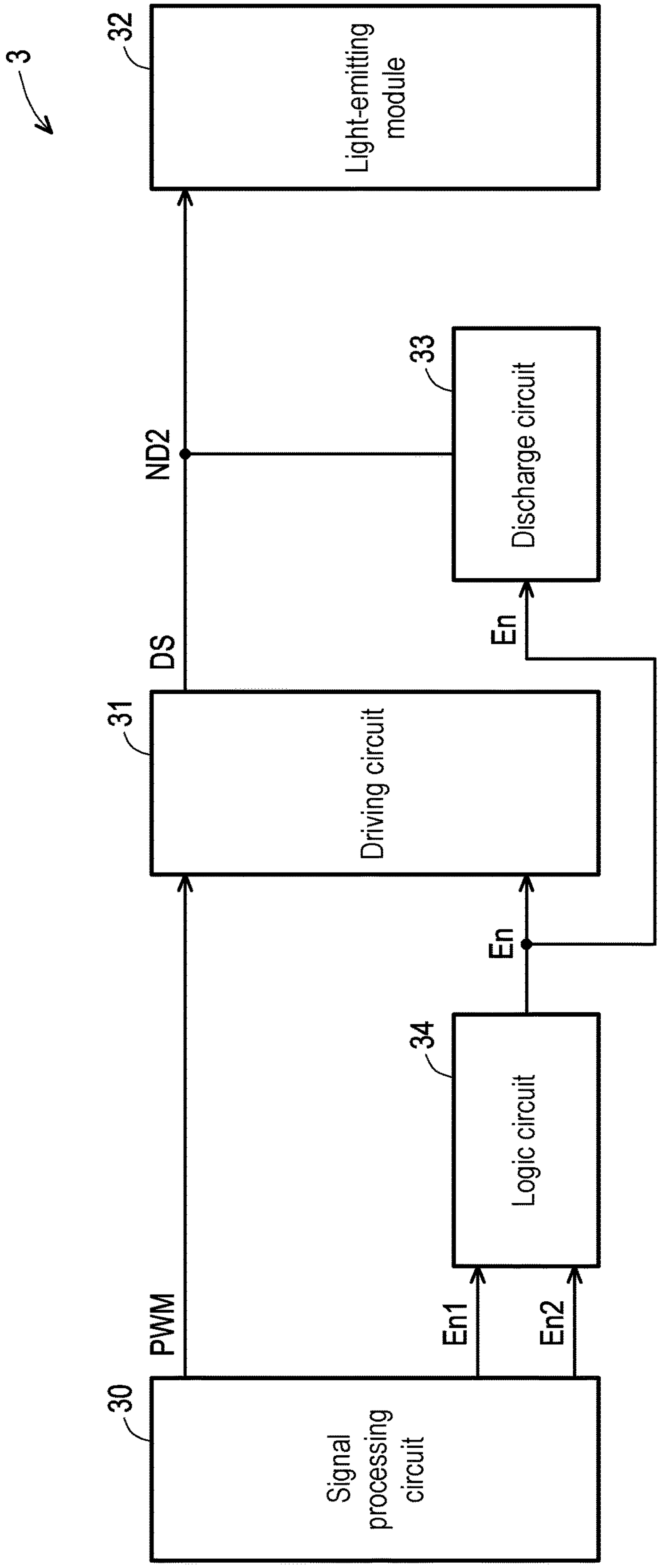
FIG. 3A is a partial circuit block diagram of the projection device 1 in FIG. 1A.

FIG. 3A is a partial circuit block diagram of the projection device 1 in FIG. 1A. A projection device 3 includes a signal processing circuit 30, a driving circuit 31, a light-emitting module 32, a discharge circuit 33, and a logic circuit 34.

Generally, the signal processing circuit 30 is configured to provide the modulation signal PWM, the first signal En1, and the second signal En2. The driving circuit 31 is coupled to the signal processing circuit 30 and a driving node ND2, and the driving circuit 31 is configured to generate a driving signal DS to the driving node ND2 according to the modulation signal PWM. The light-emitting module 32 is coupled to the driving circuit 31 through the driving node ND2 and receives the driving signal DS through the driving node ND2, so as to accordingly emit a laser beam. The discharge circuit 33 is coupled to the signal processing circuit 30 and the driving node ND2 (in detail, the discharge circuit 33 is connected to the signal processing circuit 30 by being connected to the logic circuit 34). The discharge circuit 33 is configured to selectively provide the reference voltage (e.g., ground voltage) to the driving node ND2 according to the first signal En1. The logic circuit 34 is coupled to the signal processing circuit 30, the driving circuit 31, and the discharge circuit 33. The logic circuit 34 is configured to generate a first output signal En according to the first signal En1 and the second signal En2 and provide the first output signal En to the driving circuit 31 and the discharge circuit 33.

Compared to the circuit block diagram of FIG. 1B, in FIG. 3A, the discharge circuit 33 is coupled to the driving circuit 31 for providing the driving signal DS to the driving node ND2 of the light-emitting module 32. Further, the logic circuit 34 is also arranged in FIG. 3A and is coupled to the driving circuit 31 and the discharge circuit 33. The logic circuit 34 may generate the first output signal En through the first signal En1 and the second signal En2 and control both the driving circuit 31 and the discharge circuit 33 through the first output signal En. In this way, the first output signal En is provided to both the driving circuit 31 and the discharge circuit 33 through the logic circuit 34, so that the driving circuit 31 stops operating. At the same time, the discharge circuit 33 may be turned on in real time according to the first output signal En to quickly discharge the energy storage elements connected to the driving node ND2 (details are to be described in the relevant paragraphs describing FIG. 4), so that the light-emitting module 32 temporarily stops the laser beam emission completely at the time interval when the micro-reflectors are flipped. Further, the driving circuit 31 provides the low potential driving signal DS onto the driving node ND2 according to the first output signal En, so as to prevent the discharge circuit 33 from being damaged due to the continuous driving of the driving node ND2 performed by the driving circuit 31.

For instance, the driving circuit 31 may be, for example, a power driving circuit having a boost converter, a buck converter, or any combination of the foregoing. The driving circuit 31 may, for example, be controlled by the modulation signal PWM to generate the driving signal DS with a corresponding voltage level and/or pulse width at the output terminal. The light-emitting module 32 may be configured to emit a laser beam according to the driving signal DS provided by the driving circuit 31.

Figure 3B:
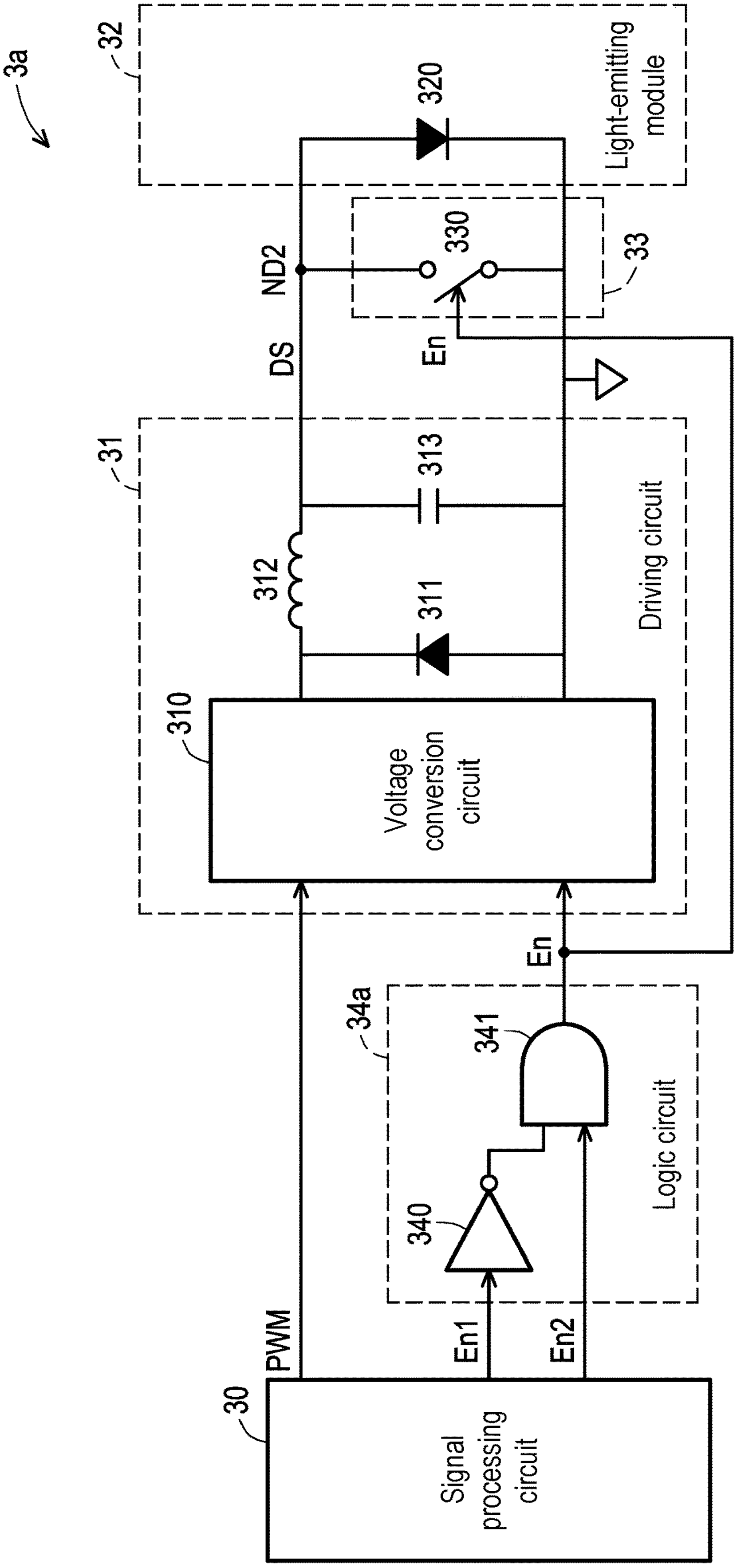
FIG. 3B is a first circuit structure diagram of FIG. 3A.

FIG. 3B is a first circuit structure diagram of FIG. 3A. In FIG. 3B, the detailed circuit structure of the driving circuit 31, the light-emitting module 32, the discharge circuit 33, and a logic circuit 34*a* is shown.

In detail, the driving circuit 31 includes a voltage conversion circuit 310, a diode 311, an inductor 312, and a capacitor 313. The voltage conversion circuit 310 may be, for example, the aforementioned boost converter or buck converter for generating the driving signal DS onto the driving node ND2 according to the modulation signal PWM and the rectification function of the diode 311, the inductor 312, and the capacitor 313. A laser diode 320 of the light-emitting module may be controlled by the voltage on the driving node ND2 to emit corresponding laser beam.

In this embodiment, the first signal En1 generated by the signal processing circuit 30 is logic 1 (e.g., high voltage level) to instruct that the voltage conversion circuit 310 is turned off (the flipping time interval of the micro-reflectors). When the first signal En1 is logic 0 (e.g., low voltage level) and the second signal En2 is logic 1 (e.g., high voltage level), the driving circuit 31 is controlled to be enabled. Further, the first output signal En generated by the logic circuit 34*a* indicates that the laser diode 320 emits light normally with logic 1 (e.g., high voltage level) and indicates that the laser diode 320 temporarily stops or stops emitting light with logic 0 (e.g., low voltage level). In response to the voltage level of the first output signal En, the driving circuit 31 operates normally when the first output signal En is logic 1 (e.g., high voltage level) and temporarily stops or stops providing the driving signal DS to the driving node ND2 when the first output signal En is logic 0 (e.g., low voltage level). Further, the discharge circuit 33 provides the reference voltage (e.g., ground voltage) to the driving node ND2 when the first output signal En is logic 0 (e.g., low voltage level) and disconnects the driving node ND2 from the reference voltage (e.g., ground voltage) when the first output signal En is logic 1 (e.g., high voltage level). To be more specific, when the first signal En1 is logic 0 (e.g., low voltage level) and the second signal En2 is logic 1 (e.g., high voltage level), the logic circuit 34*a* may generate the first output signal En of logic 1 (e.g., high voltage level), so as to instruct the driving circuit 31 to enable, provide the driving signal DS to the driving node ND2, instruct the discharge circuit 33 to be turned off, and stop supplying the reference voltage to the driving node ND2. When both the first signal En1 and the second signal En2 are logic 1 (e.g., high voltage level), the logic circuit 34 may generate the first output signal En of logic 0 (e.g., low voltage level), so as to instruct the driving circuit 31 to disable, stop supplying the driving signal DS to the driving node ND2, instruct the discharge circuit 33 to be turned on, and immediately supply the reference voltage to the driving node ND2. Simply put, a truth table about the logic circuit 34*a* and the operations of the discharge circuit 33 and the driving node ND2 may be organized as shown in Table 1 below.

TABLE 1

| En1 | En2 | En | Discharge circuit | Driving node |
|---|---|---|---|---|
| logic 0 | logic 1 | logic 1 | turned off | normal |
| logic 1 | logic 1 | logic 0 | turned on | discharging |

In order to achieve the truth table logic shown in Table 1 above, the logic circuit 34*a* includes a plurality of logic gates, that is, a NOT gate 340 (or an inverter) and an AND gate 341. The NOT gate 340 is configured to invert the first signal En1. The AND gate 341 is configured to receive the inverted first signal En1 and the second signal En2 and perform a Boolean logic AND gate operation on the two signals to generate the first output signal En. Simply put, the logic circuit 34*a* uses the second signal En2 as gate control and outputs the first output signal En according to the change of the inverted first signal En1.

The discharge circuit 33 may include a switch 330, and in the switch 330, both ends are coupled between the driving node ND2 and the reference voltage (e.g., ground voltage), and a control end is used to receive the control of the first output signal En. Further, in order to achieve turning on when the first output signal En is logic 0 (e.g., low voltage level), although it is not shown in FIG. 3B, the switch 330 may be implemented by a p-type metal-oxide-semiconductor transistor, for example, and its drain and source are respectively coupled to the driving node ND2 and the reference voltage (e.g., ground voltage), and the gate receives the first output signal En. In this way, the discharge circuit 33 may be correspondingly turned on when the first output signal En is logic 0 (e.g., low voltage level), so as to discharge the driving node ND2 to the level of the reference voltage (e.g., ground voltage).

Figure 3C:
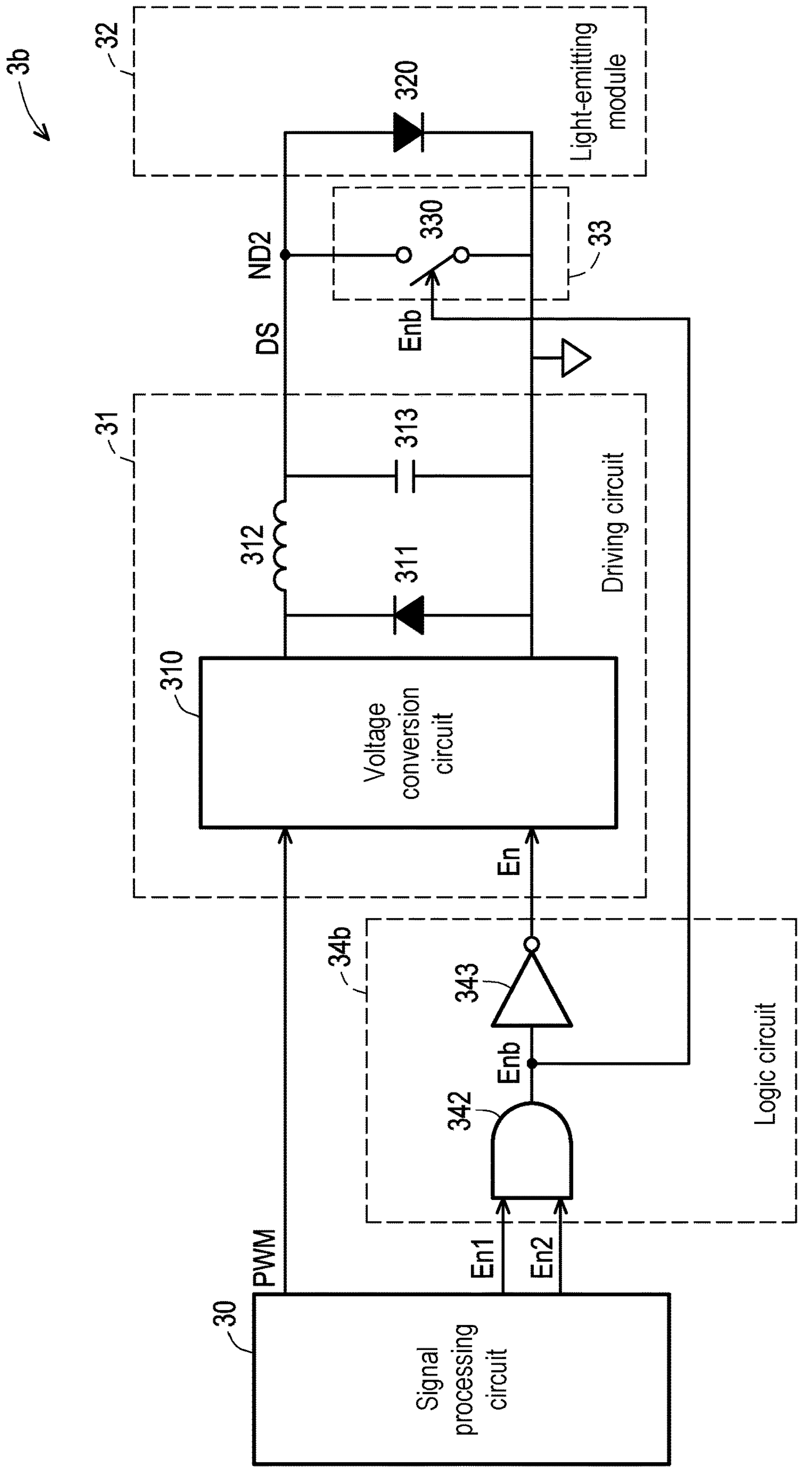
FIG. 3C is a second circuit structure diagram of FIG. 3A.

FIG. 3C is a second circuit structure diagram of FIG. 3A. In FIG. 3C, the detailed circuit structure of the driving circuit 31, the light-emitting module 32, the discharge circuit 33, and a logic circuit 34*b* is shown.

In detail, FIG. 3C is similar to FIG. 3B, the only difference is that the logic circuit 34*a* in FIG. 3B is replaced by the logic circuit 34*b* in FIG. 3C.

In this embodiment, the discharge circuit 33 may be modified, for example, to be turned on at a high voltage and turned off at a low voltage. Therefore, a truth table about the logic circuit 34*b* and the operations of the discharge circuit 33 and the driving node ND2 may be organized as shown in Table 2 below. To be specific, in order to control the modified discharge circuit 33, the logic circuit 34*b* not only generates the first output signal En to the driving circuit 31, but also provides the second output signal Enb to the modified discharge circuit 33, so as to appropriately control the discharge circuit 33 to be turned on or off within an appropriate time interval.

TABLE 2

| En1 | En2 | En | Enb | Discharge circuit | Driving node |
|---|---|---|---|---|---|
| logic 0 | logic 1 | logic 1 | logic 0 | turned off | normal |
| logic 1 | logic 1 | logic 0 | logic 1 | turned on | discharging |

In order to achieve the truth table logic shown in Table 2 above, the logic circuit 34*b* includes a plurality of logic gates, that is, an AND gate 342 and a NOT gate 343 (or an inverter). The AND gate 342 is configured to receive the first signal En1 and the second signal En2 and perform a Boolean logic AND gate operation on the two signals to generate the second output signal Enb. The NOT gate 343 receives the second output signal Enb and is configured to invert the second output signal Enb to generate the first output signal En. Simply put, the logic circuit 34*b* performs a Boolean logic operation on the first signal En1 and the second signal En2 to generate the second output signal Enb and inverts the second output signal Enb to generate the first output signal En.

The discharge circuit 33 includes the switch 330. In order to achieve turning on when the second output signal Enb is logic 1 (e.g., high voltage level), the switch 330 may be implemented by a n-type metal-oxide-semiconductor transistor, for example, and its drain and source are respectively coupled to the driving node ND2 and the reference voltage (e.g., ground voltage), and the gate receives the second output signal Enb. In this way, the discharge circuit 33 may be correspondingly turned on when the second output signal Enb is logic 1 (e.g., high voltage level), so as to discharge the driving node ND2 to the level of the reference voltage (e.g., ground voltage).

Figure 4:
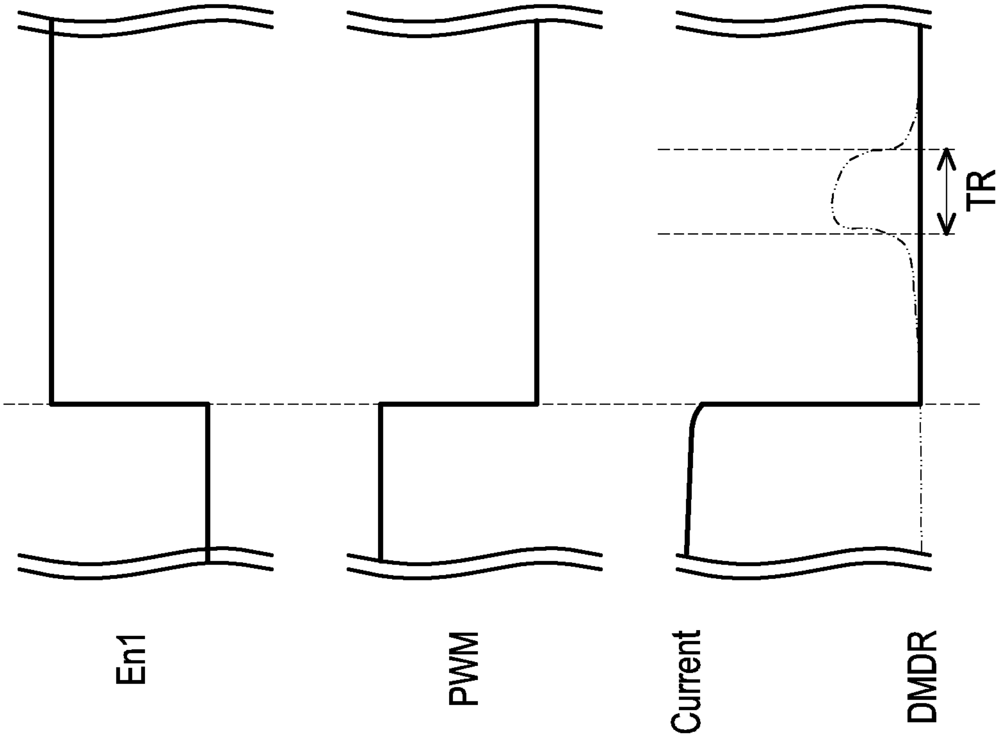
FIG. 4 is a signal waveform diagram of part of FIG. 3B.

FIG. 4 is a signal waveform diagram of part of FIG. 3B. To be specific, FIG. 4 illustrates a signal waveform diagram near the rising edge of the first signal En1. Besides, FIG. 4 also illustrates the flipping signal DMDR (not shown in FIG. 3A, FIG. 3B, nor FIG. 3C) for controlling the flipping of the micro-reflectors, which is used to indicate when the micro-reflectors actually flip. As shown in FIG. 4, when the first signal En1 rises from a low voltage level to a high voltage level, the first output signal En is logic 0 (e.g., low voltage level), so that the switch 330 (p-type metal-oxide-semiconductor transistor) of the discharge circuit 33 is turned on. As such, the driving node ND2 is instantly changed to the level of the reference voltage (e.g., ground voltage), so that the remaining energy of the energy storage elements (capacitor 313 and inductor 312) inside the driving circuit 31 may be quickly released, that is, the discharge curve of the current Current. As such, when the micro-reflector is flipping, the energy storage elements (capacitor and inductor) have completely released energy during the flipping time interval TR of the flipping signal DMDR (it can be seen that the discharge of the current Current has ended), light leakage is thus prevented from generating.

In this way, the flipping time interval TR defined by the flipping signal DMDR for controlling the flipping of the micro-reflector does not have the problem that the energy storage elements (capacitor 313 and inductor 312) have not released energy, and the two obviously do not overlap. In other words, through any one of FIG. 3A, FIG. 3B, and FIG. 3C, the light-emitting module 32 may be controlled in real time to temporarily stop light emission completely when the micro-reflector flips, light leakage is thereby effectively prevented from generating.

In FIG. 3A, FIG. 3B, and FIG. 3C, the discharge circuit 33 coupled between the driving circuit 31 and the light-emitting module 32 can directly pull down the voltage on the driving node ND2 to the level of the reference voltage (e.g., ground voltage). Further, the logic circuits 34*a* and 34*b* may also disable the driving circuit 31 together and further stop the driving signal DS from being provided to the driving node ND2, so that the discharge circuit 33 may release the energy stored in the energy storage elements (e.g., inductor 312 and capacitor 313), and that the discharge circuit 3 is effectively prevented from being damaged by the breakdown of the driving signal DS.

Figure 5A:
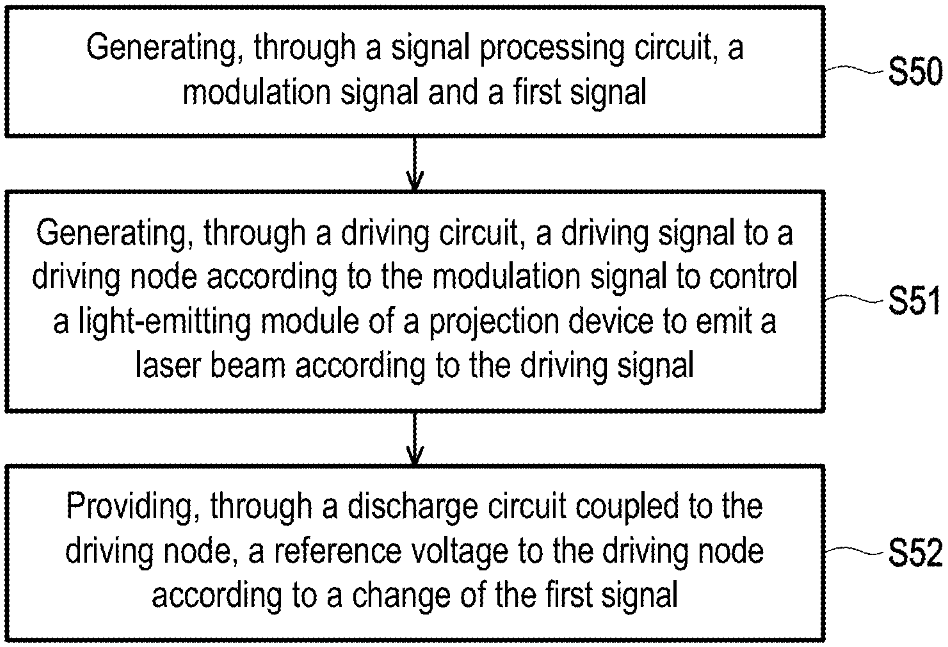
FIG. 5A is a flow chart of a driving method according to some embodiments.

FIG. 5A is a flow chart of a driving method according to some embodiments. The flow chart in FIG. 5A may be used to drive or control the circuits in FIG. 3A, FIG. 3B, and FIG. 3C. The driving method in FIG. 5A includes steps S50 to S52. In step S50, a signal processing circuit generates a modulation signal and a first signal. In step S51, a driving circuit generates a driving signal to a driving node according to the modulation signal to control a light-emitting module of the projection device to emit a laser beam according to the driving signal. In step S52, a discharge circuit coupled to the driving node selectively provides a reference voltage to the driving node according to the change of the first signal. In detail, for the detailed operation of the driving method, reference may be made to the description in the paragraphs of FIG. 3A, FIG. 3B, and FIG. 3C in the above paragraphs, so details are not repeated herein.

Figure 5B:
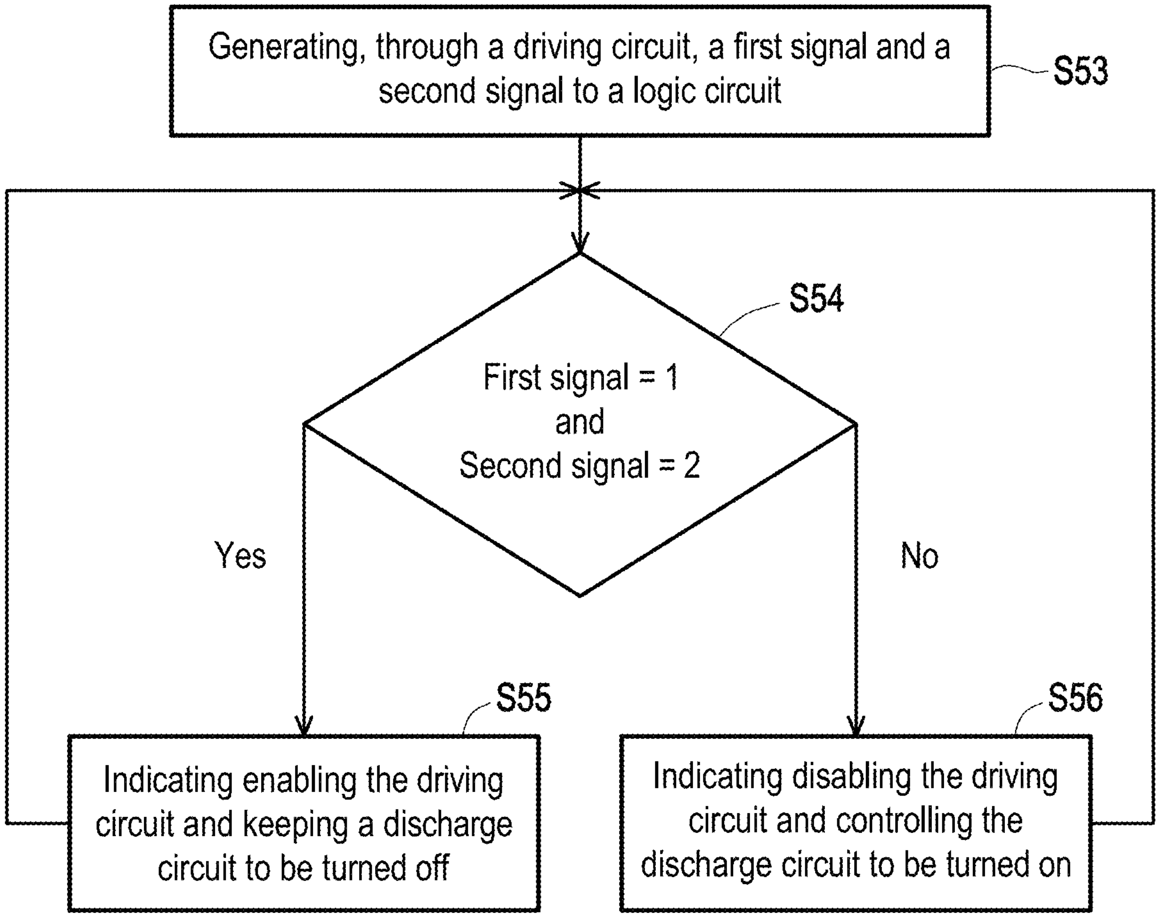
FIG. 5B is a flow chart of a driving method according to some embodiments.

FIG. 5B is a flow chart of a driving method according to some embodiments. The flow chart in FIG. 5B may be used to drive or control the circuits in FIG. 3A, FIG. 3B, and FIG. 3C. The driving method in FIG. 5B includes steps S53 to S56. In step S53, a signal processing circuit generates a first signal and a second signal to a logic circuit. In step S54, a logic circuit determines whether the first signal is logic 0 (e.g., low voltage level) and whether the second signal is logic 1 (e.g., high voltage level). When the determination result in step S54 is Yes, step S55 is performed, and the logic circuit generates a first output signal to indicate enabling a driving circuit and keeping a discharge circuit to be turned off. In contrast, when the determination result in step S54 is No, step S56 is performed, and the logic circuit generates the first output signal to indicate disabling the driving circuit and controlling the discharge circuit to be turned on. In detail, for the detailed operation of the driving method, reference may be made to the description in the paragraphs of FIG. 3A, FIG. 3B, and FIG. 3C in the above paragraphs, so details are not repeated herein.

In some embodiments, a person having ordinary skill in the art may modify or alter the implementation of the above circuit details. For instance, the first signal En1, the second signal En2, and the first output signal En use logic 0 or logic 1 to indicate the relationship between enabling and disabling, which can certainly be adjusted adaptively. The first signal En1 may also be logic 0 (e.g., low voltage level) to indicate the flipping time interval of the micro-reflector, and the second signal En2 may also be logic 0 (e.g., low voltage level) to instruct the driving circuit to work to provide the driving signal DS onto the driving node ND2. Therefore, the logic circuit and the discharge circuit may adjust their internal circuit structures in response to different signal configurations, which all belong to the scope of the variant embodiments of the projection device.

In view of the foregoing, in the projection device, the discharge circuit may be arranged in the driving circuit to provide the reference voltage to the driving node of the light-emitting module. The discharge circuit coupled between the driving circuit and the light-emitting module may more directly and quickly discharge the energy storage elements (capacitor and inductor) in the driving circuit, and the light leakage problem when the micro-reflector flips is effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:

a signal processing circuit configured to provide a modulation signal, a first signal, and a second signal;

a driving circuit coupled to the signal processing circuit and a driving node, wherein the driving circuit is configured to generate a driving signal to the driving node according to the modulation signal;

a light-emitting module coupled to the driving circuit through the driving node, wherein the light-emitting module is configured to receive the driving signal from the driving node to accordingly emit a laser beam;

a logic circuit coupled to the signal processing circuit, and the driving circuit, wherein the logic circuit is configured to generate a first output signal according to the first signal and the second signal, and is configured to provide the first output signal to the driving circuit; and a discharge circuit coupled to the signal processing circuit, the logic circuit, and the driving node, wherein the discharge circuit is configured to selectively provide a reference voltage to the driving node according to the first output signal.

2. The projection device according to claim 1, wherein when the first signal is provided with a first voltage level and the second signal is provided with the first voltage level, the logic circuit generates the first output signal with a second voltage level, so that the discharge circuit provides the reference voltage to the driving node.

3. The projection device according to claim 1, wherein the logic circuit provides the first output signal to both the driving circuit and the discharge circuit, so as to provide the first output signal to the driving circuit and the discharge circuit while disabling the driving circuit from generating the driving signal to the driving node.

4. The projection device according to claim 1, wherein the discharge circuit comprises:

a pull-down transistor having a drain and a source respectively coupled to the driving node and the reference voltage and a gate receiving the first output signal.

5. The projection device according to claim 1, wherein the signal processing circuit distinguishes a disabled interval in each frame time by the first signal, wherein a ratio of the disabled interval to a duration of each frame time is 1/99.

6. The projection device according to claim 1, wherein the logic circuit comprises:

a NOT gate configured to invert the first signal; and an AND gate configured to generate the first output signal according to the inverted first signal and the second signal.

7. The projection device according to claim 1, wherein the logic circuit comprises:

an AND gate configured to generate a second output signal according to the first signal and the second signal; and a NOT gate configured to invert the second output signal to the first output signal, wherein the first output signal is provided to the driving circuit, and the second output signal is provided to the discharge circuit.

8. A driving method of a projection device, comprising:

generating, through a signal processing circuit, a modulation signal, a first signal, and a second signal;

generating, through a driving circuit, a driving signal to a driving node according to the modulation signal to control a light-emitting module of the projection device to emit a laser beam according to the driving signal;

generating, through a logic circuit, a first output signal according to the first signal and the second signal and providing the first output signal to the driving circuit; and selectively providing, through a discharge circuit coupled to the driving node and the logic circuit, a reference voltage to the driving node according to the first output signal.

9. The driving method according to claim 8, wherein when the first signal is provided with a first voltage level and the second signal is provided with the first voltage level, the first output signal with a second voltage level is generated through the logic circuit, so that the discharge circuit provides the reference voltage to the driving node.

10. The driving method according to claim 8, wherein the first output signal is provided to both the driving circuit and the discharge circuit by the logic circuit, so as to provide the first output signal to the driving circuit and the discharge circuit while disabling the driving circuit from generating the driving signal to the driving node.

11. The driving method according to claim 8, wherein the discharge circuit comprises a pull-down transistor, and in the driving method, a drain and a source of the pull-down transistor are respectively coupled to the driving node and the reference voltage, and a gate of the pull-down transistor receives the first output signal.

12. The driving method according to claim 8, further comprising generating, through the signal processing circuit, the first signal to distinguish a disabled interval in each frame time, wherein a ratio of the disabled interval to a duration of each frame time is 1/99.

13. The driving method according to claim 8, wherein the logic circuit further comprises a NOT gate and an AND gate, and the step of generating, through the logic circuit, the first output signal according to the first signal and the second signal comprises:

inverting, through the NOT gate, the first signal; and generating, through the AND gate, the first output signal according to the inverted first signal and the second signal.

14. The driving method according to claim 8, further comprising providing, through the signal processing circuit, a second signal to instruct the driving circuit, wherein the logic circuit further comprises an AND gate and a NOT gate, and the step of the logic circuit comprises:

generating, through the AND gate, a second output signal according to the first signal and the second signal; and inverting, through the NOT gate, the second output signal to the first output signal; and providing the first output signal to the driving circuit and providing the second output signal to the discharge circuit.

* * * * *